US012752346B2

(12) United States Patent
Wagner et al.

(10) Patent No.: US 12,752,346 B2
(45) **Date of Patent: *Oct. 6, 2026**

(54) WORKPIECE HOLDING DEVICE

(71) Applicant: AKTIEBOLAGET SKF, Gothenburg (SE)

(72) Inventors: Gerhard Wagner, Prichsenstadt (DE); Fred Menig, Sulzthal (DE); Martina Sticht, Sennfeld (DE); Michael Wendel, Bremen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 705 days.

This patent is subject to a terminal disclaimer.

(21) Appl. No.: 18/117,595

(22) Filed: Mar. 6, 2023

(65) Prior Publication Data

US 2023/0286061 A1 Sep. 14, 2023

(30) Foreign Application Priority Data

Mar. 11, 2022 (DE) ......................... 102022202464.8

(51) Int. Cl.
*B23B 31/16* (2006.01)

(52) U.S. Cl.
CPC .............................. *B23B 31/16275* (2013.01)

(58) Field of Classification Search
CPC ........ B23B 31/16275; B23B 31/16287; B23B 2231/22; B23B 2231/26; B23B 2260/008; B23B 2260/116; C21D 9/0062; C21D 1/00; C21D 1/42; C21D 1/62; C21D 9/40
USPC .................................................... 266/44, 129
See application file for complete search history.

(56) References Cited

U.S. PATENT DOCUMENTS

| | | | |
|---|---|---|---|
| 2,723,861 | A | 11/1955 | Eisler |
| 2,919,925 | A | 1/1960 | Snyder et al. |
| 3,023,016 | A | 2/1962 | Multer et al. |
| 3,041,079 | A | 6/1962 | Garrison et al. |

(Continued)

FOREIGN PATENT DOCUMENTS

| | | | | |
|---|---|---|---|---|
| CN | 114042947 A | | 2/2022 | |
| DE | 102018212771 | * | 2/2020 | ........... C21D 9/0025 |

(Continued)

OTHER PUBLICATIONS

DE102018212771, Menig et al. Workpiece Retainer,Feb. 6, 2020 (Year: 2020).*

(Continued)

*Primary Examiner* — Jessee R Roe
*Assistant Examiner* — Michael Aboagye
(74) *Attorney, Agent, or Firm* — J-TEK LAW PLLC; Scott T. Wakeman; Mark A. Ussai

(57) ABSTRACT

A workpiece holding device for holding a workpiece in a heat treatment system while the workpiece undergoes a thermal expansion and/or contraction includes at least two clamping units configured to apply a radial and/or an axial clamping force to the workpiece to hold the workpiece in the workpiece holding device in a predefined position and a drive unit configured to rotate the workpiece in the workpiece holding device. The at least two clamping units may be configured to adjust their position relative to the holding device to maintain the clamping force during the thermal expansion and/or contraction of the workpiece.

17 Claims, 4 Drawing Sheets

(56) References Cited

U.S. PATENT DOCUMENTS

| | | | | |
|---|---|---|---|---|
| 3,716,224 | A | 2/1973 | Gross | |
| 3,727,772 | A | 4/1973 | Pauls | |
| 3,850,058 | A | 11/1974 | Bachmann | |
| 3,945,654 | A | 3/1976 | McMullen | |
| 3,985,051 | A | 10/1976 | Brown | |
| 4,459,451 | A * | 7/1984 | Regele | H05B 6/40 219/652 |
| 4,530,507 | A | 7/1985 | Lee, Jr. | |
| 4,576,067 | A | 3/1986 | Buck | |
| 4,701,584 | A | 10/1987 | Rylicki | |
| 4,838,562 | A | 6/1989 | Akashi | |
| 4,998,663 | A | 3/1991 | Cakmak et al. | |
| 5,234,201 | A * | 8/1993 | Chatterjee | C21D 1/10 266/125 |
| 5,685,996 | A | 11/1997 | Ricci | |
| 6,568,694 | B1 | 5/2003 | White | |
| 6,612,589 | B2 | 9/2003 | Saito | |
| 6,918,278 | B2 | 7/2005 | Dole et al. | |
| 8,993,942 | B2 * | 3/2015 | Fitch | H05B 6/101 219/641 |
| 9,169,529 | B2 * | 10/2015 | Johnson | H05B 6/101 |
| 9,802,269 | B2 | 10/2017 | Rudolph et al. | |
| 10,940,548 | B2 | 3/2021 | Garcés et al. | |
| 11,027,381 | B2 | 6/2021 | Onushko et al. | |
| 11,154,938 | B2 | 10/2021 | Maurer | |
| 11,465,230 | B2 | 10/2022 | Nakaya et al. | |
| 11,707,797 | B2 | 7/2023 | Kitakaze | |
| 2001/0001935 | A1 | 5/2001 | Wilk, Jr. et al. | |
| 2004/0206218 | A1 | 10/2004 | Nybo | |
| 2023/0286062 | A1 | 9/2023 | Wagner et al. | |
| 2023/0286063 | A1 | 9/2023 | Wagner et al. | |
| 2023/0287532 | A1 | 9/2023 | Wagner et al. | |
| 2023/0287533 | A1 | 9/2023 | Wagner et al. | |

FOREIGN PATENT DOCUMENTS

| | | | |
|---|---|---|---|
| DE | 102018212771 | A1 | 2/2020 |
| DE | 102018212773 | A1 | 2/2020 |
| DE | 102018212778 | A1 | 2/2020 |
| EP | 0899061 | A2 | 3/1999 |
| SU | 1480973 | A1 | 5/1989 |
| WO | 2012101319 | A1 | 8/2012 |

OTHER PUBLICATIONS

Office Action from the United States Patent Office mailed Dec. 16, 2025 in related U.S. Appl. No. 18/117,600.

Office Action from the United States Patent Office mailed Feb. 25, 2026 in related U.S. Appl. No. 18/117,607.

Office Action from the United States Patent Office mailed Dec. 18, 2025 in related U.S. Appl. No. 18/117,609.

Office Action from the United States Patent Office mailed Oct. 9, 2025 in related U.S. Appl. No. 18/117,614.

* cited by examiner

WORKPIECE HOLDING DEVICE

CROSS-REFERENCE

This application claims priority to German patent application no. 10 2022 202 464.8 filed on Mar. 11, 2022, the contents of which are fully incorporated herein by reference.

TECHNOLOGICAL FIELD

The present disclosure is directed to a workpiece holding device for holding a workpiece in a heat-treatment system, in which the workpiece experiences a thermal expansion and/or contraction due to a heat treatment or an expansion and/or contraction due to a density difference arising in the microstructure during the phase transformation.

BACKGROUND

In order to treat workpieces thermally, for example, in order to heat or to quench them, the workpieces must be disposed securely and with positional accuracy relative to the treatment system in order to achieve very precise heat inputs and subsequently defined quenching processes of the treatment zones. For this purpose conventional clamping means can be used, such as, for example, so-called three- or four-jaw chucks that include three or four clamping jaws that are mounted on a work table and grouped circumferentially around the workpiece to be held. Prior to the treatment of the workpiece, the workpiece is clamped and held in these clamping jaws, wherein a repositioning of the clamping jaws is possible in order to compensate for a thermal contraction and/or expansion, or a contraction and/or expansion arising due to a density difference arising in the microstructure during the phase transformation. Furthermore, it is known with such devices to move the entire work table, together with the clamping jaws, past fixed heat sources in order to simplify the repositioning of the supply lines needed for the heat sources.

However, it is disadvantageous in this device that due to the thermal expansion or contraction to be compensated for, the force that is needed for the repositioning of the jaws may be chosen too low, and it can then nonetheless result that the jaws no longer abut against the workpiece and thus cannot sufficiently fix it, or a too-high force of the jaws leads to a deformation of the workpiece.

Furthermore, with the known devices it is problematic that the large mass to be moved comprised of work table, clamping jaws, and workpiece leads to very high wear in the drive system of the work table so that its components must often be replaced or the drive must be completely exchanged. Also, due to the large mass to be moved and the dimensions of the device, limits are set overall for the process parameters, such as, for example, a relative speed between inductor and workpiece, with the result that an optimized heat input into the workpiece cannot always be achieved.

However, the heat input and the distribution of the heat input in the workpiece are of enormous importance in order to achieve the desired workpiece properties in the treatment zones and to control the resulting dimensional and shape changes (workpiece warpage). Known possibilities for influencing the heat input and the temperature distribution in the case of the example of an inductive hardening are a suitable choice of the process parameters or of the process design (electrical power, heating time, heating frequency, inductor-workpiece coupling distance, inductor material, inductor design, targeted use of magnetic field concentrators, workpiece material, previous condition of the workpiece material, relative speed of the workpiece with respect to the inductor, etc.)

SUMMARY

The workpiece holding device is therefore a decisive element of the heat-treatment system and of the success of the heat treatment. It is therefore an aspect of the present disclosure to provide a workpiece holding device, in particular a workpiece clamping system, that fulfills the following functions, preferably holistically:

- Ensure a predefined inductor-workpiece coupling distance;
- Position the workpiece in a defined position;
- Hold the workpiece in a defined position against the acting forces (e.g., magnetic fields) during the entire process time;
- Ensure good reproducibility of the heat treatment;
- Allow the heat treatment at all positions of the workpiece (inside, outside, side surfaces above and below);
- Avoid crack formation.

In the following, a workpiece holding device is presented for holding a workpiece in a heat-treatment system in which the workpiece held in the workpiece holding device experiences a thermal expansion and/or contraction, or an expansion and/or contraction that occurs due to a density change in the microstructure during the phase transformation. In the following, only thermal expansion or contraction is discussed, since even with a phase transformation a thermal component is usually present. Furthermore, the workpiece holding device includes at least two clamping units that are designed to apply a radial and/or axial clamping force onto the workpiece so that the workpiece is positioned in the workpiece holding device in a predefined position. The workpiece is in particular a closed curve that is preferably rotationally symmetric, such as, for example, an element of a plain or rolling-element bearing, a bearing ring, a gear, a bolt, a sleeve, a disc, etc.

In order to reduce the wear of the components of the workpiece holding device, in particular due to high mass, and at the same time to optimize the heat input into the workpiece, at least one drive unit is provided that is designed to move, in particular to set in rotation, the workpiece held in the workpiece holding device. Since only the workpiece, but not the entire unit comprised of the workpiece, the work table, the clamping units, and further equipment must be set into motion, but rather only the workpiece, even with large workpieces a large weight reduction can be achieved of the parts to be set in motion. This in turn also allows, in addition to the lower loading of the components, and thus also lower wear of the components of the drive system, a more precise setting of the process parameters, such as, for example, the relative speed, and thus an improved heat input into the workpiece. Furthermore, less energy need be expended in order to set the workpiece in rotation than with the conventional systems so that a cost reduction is also thereby possible.

According to one advantageous exemplary embodiment, the at least one drive unit is designed to abut against the workpiece and is formed as a friction wheel or friction roller that interacts in a friction-fit manner with the workpiece in order to move it. A particularly simple and cost-effective drive can thus be provided for the workpiece.

It is advantageous in particular here when the friction force applied between drive unit and workpiece is defined by a contact force between drive unit and workpiece. It can thereby be ensured that even with thermal contraction or expansion, or a contraction or expansion due to a density difference arising in the microstructure during the phase transformation, an optimized drive of the workpiece is provided. Here it is advantageous in particular when a measuring device, for example, a pressure sensor, that determines the contact force is provided on the drive unit. An embodiment is also advantageous here in which, based on the measured contact force, a unit can control the drive unit such that the contact force and thus the friction force is optimized. It can thereby be ensured that even with thermal expansion or contraction, or an expansion or contraction due to a density difference arising in the microstructure during the phase transformation, or with structural non-uniformities, such as, for example, an imbalance, the workpiece is nonetheless always driven with a constant force. Damage due to high force on the workpiece is also avoided.

Furthermore, it can also thereby be ensured that a slippage between workpiece and drive unit is minimized. In addition, due to the specific contact force, wear between workpiece and drive unit can also be minimized. The workpiece warpage can also thereby be minimized, and/or plastic workpiece deformations can be avoided or minimized. In addition, the defined friction force allows a precise setting of the relative speed; in particular, it is possible to allow the workpiece to rotate with a defined speed.

According to a further preferred exemplary embodiment, the workpiece holding device furthermore includes at least two, preferably at least three, support units that are designed for the workpiece to lie against them. It can thereby be ensured on the one hand that the workpiece is supported in a tilt-free manner and on the other that the workpiece is movable easily and in a low-friction manner.

According to a further preferred exemplary embodiment, the clamping units each include at least one rotatable clamping element abutting against the workpiece; the rotational axis of the clamping element is preferably configured parallel to a rotational axis of the workpiece. Of course, a rotational axis inclined with respect to the rotational axis of the workpiece is also possible. Alternatively or additionally, the support units each include at least one rotatable support cylinder on which the workpiece is supported and whose rotational axis is preferably configured perpendicular to a rotational axis of the workpiece. Also alternatively or additionally, the rotational axis of the clamping element and/or of the support cylinder can be oriented parallel to a surface of the workpiece to be rotated. For example, these rotatable elements can be moved along passively during moving of the workpiece and thus reduce a friction during the moving of the workpiece.

According to a further preferred exemplary embodiment, instead of a line contact of the clamping element or of the support cylinder, the clamping element or the support cylinder can also contact the workpiece only in a point contact, which has the advantage of applying an axially directed force onto the workpiece. Thus, for example, the workpiece can simultaneously be secured in its axial position by the driven clamping cylinder/support cylinder.

Unless explicitly indicated, in the following the term “rotatable element” refers both to clamping cylinders and to support cylinders.

According to a further preferred exemplary embodiment, at least one of the clamping units can be configured as a drive unit. It is preferred in particular here when the rotatable element described above is actively rotationally driven. In this case, the rotatable element can be designed as a friction wheel or friction roller that abuts against the workpiece. It is also possible that the rotatable element includes only a friction surfacing or a friction coating that frictionally abuts against the workpiece and provides the active drive.

Alternatively or additionally, at least one of the support units can also be designed as a drive unit. Here also it is particularly preferred when the rotatable element described above is actively rotationally driven. Also in this case, the rotatable element can be configured as a friction wheel or friction roller that abuts against the workpiece. It is also possible that the rotatable element only includes a friction surfacing or a friction coating that provides the active drive.

Furthermore, as already indicated above, an exemplary embodiment is preferred in which the rotatable element of the at least one clamping unit and/or support unit configured as drive unit is actively driven, wherein the at least one rotatable element of the clamping unit and/or support unit not configured as drive unit is respectively set into rotation passively by the movement of the workpiece. This makes possible a particularly low-friction and energy-saving movement of the workpiece.

According to a further preferred exemplary embodiment, at least one rotational speed measuring unit is furthermore provided that determines a rotational speed of the drive unit, and wherein a further rotational speed measuring unit is provided on one of the passive rotating elements; the rotational speed measuring unit determines a rotational speed of the passively driven clamping units and/or support units. Furthermore, a controller is preferably provided that is designed to determine a slippage of the workpiece from the rotational-speed difference between the actively driven and passively driven elements. In addition to the contact force determination described above, the speed measurement can also be used to determine whether there is sufficient frictional force/contact force of the drive unit, or whether the clamping force applied by the clamping units is sufficient to secure the workpiece sufficiently firmly in the workpiece holder. Thus, for example, the controller can be designed to control the drive unit and/or the clamping unit and/or the support unit in order to optimize the contact force or the clamping force and to minimize the slippage.

In particular, when a predetermined rotational speed difference is exceeded, it is advantageous when the controller is furthermore designed to increase a contact force of the friction roller/of the friction wheel and/or a clamping force of the clamping units and/or to issue a notification about an increased slippage.

As mentioned above, the clamping units of the workpiece holding device apply a clamping force to the workpiece and ensure a secure and positionally accurate grip of the workpiece in the workpiece holding device. Here it is preferred in particular when the clamping units include at least one movable element or are themselves formed as a movable element that is preloaded toward the workpiece such that the movement of the movable element follows the thermal expansion and/or contraction or an expansion and/or contraction arising due to a density difference arising in the microstructure during the phase transformation.

With the aid of the movable elements, the workpiece can be clamped with a defined force and defined force application points. In addition, due to the thermal contraction in the temperature range of the phase transformations ferrite/alpha iron to austenite/gamma iron (A1 temperature to A3 temperature, at approximately 740° C. to 860° C. depending on steel, microstructural condition, and heating speed) and/or due to the subsequent cooling process, it can thereby be made possible to follow a workpiece shrinkage or the reduced workpiece growth. At the same time, however, due to the movable elements, a workpiece growth or the reduced workpiece shrinkage due to the volume increase during the quenching in the range of the phase transformation from austenite/gamma iron to martensite and/or bainite/pearlite/ferrite (depending on the solution state and steel, this temperature range of the martensite formation can typically fall at approximately 400° C. to 100° C.) can also be followed.

Here it is advantageous in particular when, with an essentially circular workpiece to be treated, the movable element is movable axially, radially, and tangentially. Not only can thermal expansions/contractions thereby be absorbed during the thermal processing of the workpiece, but manufacturing tolerances, such as, for example, a certain ovality of the workpiece can also be compensated for during the clamping. Such an adapting is advantageous in particular with workpieces with closed curves, such as, for example, elements of a plain or rolling-element bearing, bearing rings, gears, bolts, sleeves, discs, etc.

In particular with annular workpieces, the clamping units are preferably displaceable radially, for example, by electric or hydraulic drive, and prior to the thermal treatment are moved toward the workpiece until it is firmly held between the clamping units. In order to be able to compensate for manufacturing tolerances, one or more of the clamping units can be supported such that it is eccentrically displaceable.

A further embodiment provides that axially acting clamping units, in particular hold-down clamps, can also follow the workpiece in the axial direction of the thermal expansion/contraction. Here it is advantageous in particular when the movable element is formed as an eccentrically supported element, since the eccentric supporting provides both a radial and a tangential movability of the element. In addition, the axially acting clamping units allow the workpiece to be held steady in its position even with light workpieces and strong magnetic fields of the induction coils.

According to a further preferred exemplary embodiment, a controller is furthermore provided that controls a contact force or clamping force of the clamping unit, wherein the controller is preferably designed to control the movement of the movable element. Thus, for example, the clamping unit can include at least one measuring device for the recording of shape and dimensional changes during the heating process and after the conclusion of the heating process (warpage). The data recorded can also be used for subsequent processing procedures in order to undertake individual workpiece adaptations to the processes. In one preferred exemplary embodiment, at least one clamping unit, in particular the movable element, includes at least one force-measuring device that interacts with the controller and is configured to measure the contact force with which the clamping unit, in particular the movable element, abuts against the workpiece.

Furthermore, the movable element itself can also be configured as a drive unit.

According to a further advantageous exemplary embodiment, the clamping of the movable element is effected by a mechanical preload element. Mechanical preload elements can be easily installed and do not require additional controlling, which overall makes the workpiece holding device easily operable and cost-effective.

Here the mechanical preload element can be at least one spring element that interacts with the movable element and preloads the movable element toward the workpiece. For example, the spring element can be a wire spring, a plate spring, coil spring, and/or leaf spring, but plastics can also be used, such as, for example, an elastomer.

Furthermore, it is possible that the mechanical preload is formed as a friction device that makes possible a movement of the movable element only after exceeding of a certain friction value. Based on the pressure that an expanding/contracting workpiece exerts on the movable element during a thermal processing, a movement of the movable element can thereby be effected only after exceeding of a certain threshold value.

Instead of a mechanical preload device, the preload of the movable element can also be effected by a device that is controllable by a controller. Here the preload can be effected, for example, by a hydraulically, pneumatically, and/or electrically operated element that follows the thermal expansion/contraction or an expansion/contraction due to a density difference arising in the microstructure during the phase transformation. For example, the movable element can be an oil or gas operated pressure damper.

A particularly precise tracking or following of the contraction/expansion is possible specifically with a preloading controlled with a controller. In order to increase the precision and sensitivity of the tracking, as mentioned above, the clamping unit, the support unit, and/or the drive unit can be equipped with at least one force measuring device that interacts with the controller and is designed to measure the contact force, clamping force, and/or friction force. Depending on this measured force, the controller can then control the clamping unit, the support unit, and/or the drive unit in order to exert a uniform force on the workpiece during the treatment. In addition, due to the force measuring device, an adapting to manufacturing inaccuracies is possible during the clamping of the workpiece into the workpiece holding device so that a uniform pressure on the various clamping units is already achieved during the clamping of the workpiece.

Alternatively or additionally, of course, the controller can also control the clamping unit, the support unit, and/or the drive unit based on a pre-calculated value table in order to be able to balance the calculated and expected expansions/contractions. Here the value table can be determined empirically and/or stored in a database that is accessible to the controller. This means the database can be stored internally in the controller itself or be available in an external database.

In one preferred embodiment, the controller can also additionally react to forces that act on the workpiece due to the processing system and increase or decrease a preload in a targeted manner depending on measured forces or proactively. For example, in anticipation of electrical, mechanical or magnetic forces that temporarily act on the workpiece, the current preload can be increased or decreased by a preload value in a controlled manner. This temporary superposition of the preload regulated based on the thermal expansion with a controlled offset can preferably be turned on and off. Here also, the clamping unit, support unit, and/or drive unit can be controlled based on a value table in order to be able to reliably support and/or balance the calculated and expected forces on the workpiece. Furthermore, the controller can be designed such that it can be switched from a regulated operation, in which the preload forces are set based on measured values of the force measuring device, e.g., a load cell, to a controlled operation, in which the preload forces are set based on a value table, and can correspondingly be switched back from the controlled operation into the regulated operation. Thus it is possible, for example, during a thermal expansion, to regulate the preload to the greatest possible extent or completely based on a predetermined preload pressure and during a subsequent thermal contraction, such as, for example, a rapid quenching, to increase the preload pressure to a fixed value.

Here the value table or a setting of the clamping force, contact force, and/or friction force based on values of the value table, can depend in particular on measured and/or calculated temperature changes that are to be expected in the workpiece during the processing procedure.

According to a further advantageous exemplary embodiment, at least one of the clamping units is formed as an eccentrically mounted clamping cylinder or slide shoe. The clamping cylinder and/or slide shoe can themselves be formed as movable or rotatable elements. However, alternatively or additionally it is also possible that they each include at least one further movable element. Furthermore, ribbings, or coatings made of, for example, friction particles, can advantageously be applied to the clamping cylinder; the ribbings or coatings facilitate the contact with the workpiece and ensure a movement/drive of the workpiece in the workpiece holding device.

The clamping units, support units, and/or drive units of the workpiece holding device can be individually or jointly controllable.

In order that the clamping units, support units, and./or drive units do not themselves experience too large a thermal expansion/contraction, they are advantageously made from a temperature-resistant material, such as, for example, ceramic, polymer ceramic, aluminum silicate, stone, fireclay, or from special steel alloys.

According to a further exemplary embodiment, a workpiece holding device for holding a workpiece in a heat treatment system while the workpiece undergoes a thermal expansion and/or contraction includes a main body portion, at least three support cylinders extending from the main body portion and configured to axially support the workpiece, and at least three clamping cylinders configured to apply a radial clamping force to the workpiece to hold the workpiece in the main body portion. A first one of the at least three clamping cylinders is configured to be actively driven to rotate the workpiece in the main body portion and all other ones of the at least three clamping cylinders are passively driven by contact with the workpiece, and the at least three clamping cylinders are configured to move to maintain the radial contact force during the thermal expansion and/or contraction of the workpiece A further aspect of the present disclosure relates to a method for the thermal treatment of a workpiece that is held in a workpiece holding device as described above, in which the method includes the following steps:

- inserting the workpiece into the workpiece holding device;
- clamping the clamping units until each clamping unit contacts the workpiece and abuts against the workpiece with a predeterminable, preferably equally high, clamping force;
- activating the drive unit for the moving of the workpiece in the workpiece holding device, preferably with a predetermined rotational speed;
- starting the thermal treatment;
- actively or passively readjusting the clamping units and/or drive unit during the thermal treatment so that a predetermined clamping force, friction force, and/or contact force is applied between the clamping unit and/or drive unit during predeterminable time periods or the entire thermal treatment.

Deformations during the thermal treatment of the workpiece can thereby be avoided.

Further advantages and advantageous embodiments are specified in the description, the drawings, and the claims. Here in particular the combinations of features specified in the description and in the drawings are purely exemplary so that the features can also be present individually or combined in other ways.

In the following the invention is described in more detail using the exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
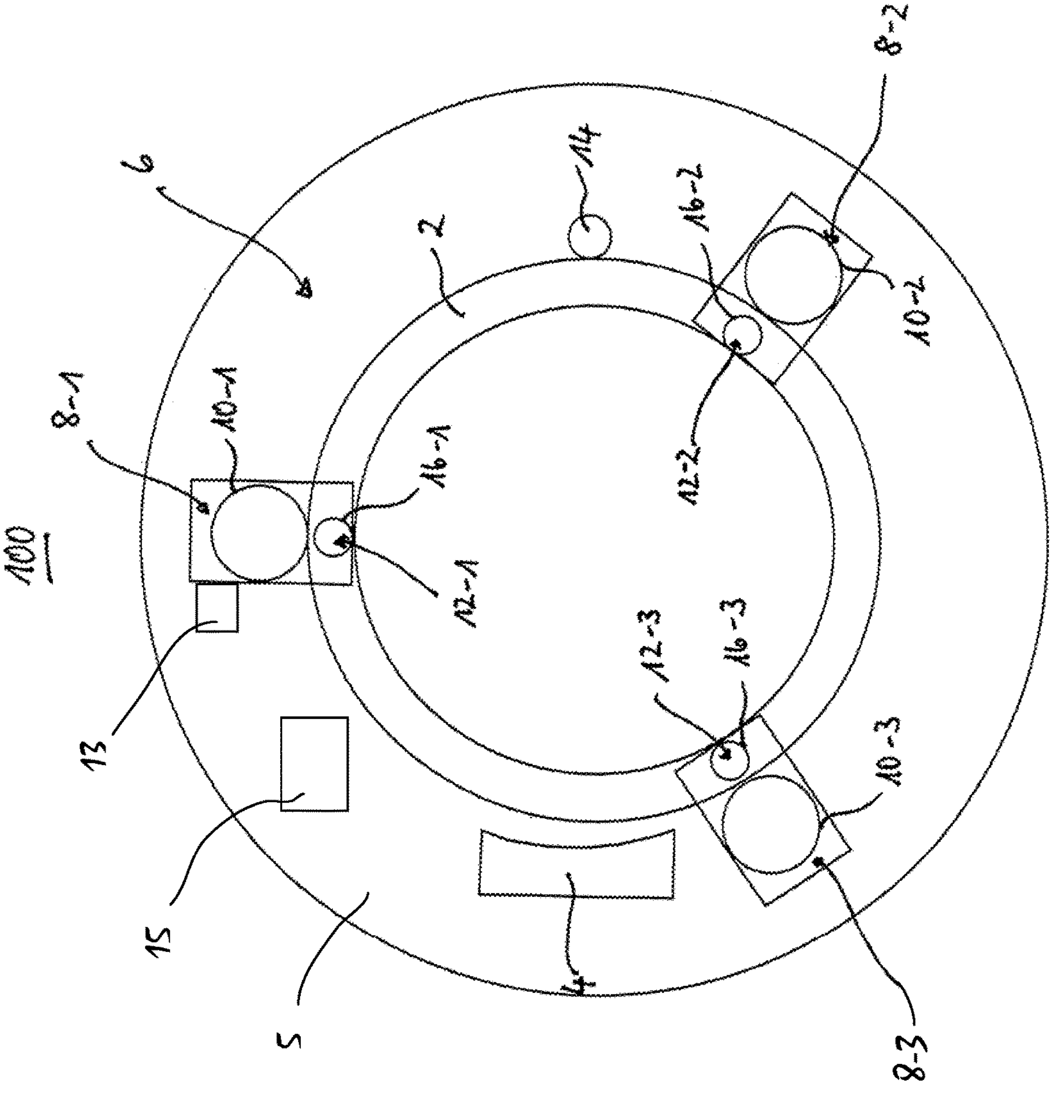
FIG. 1 is a schematic plan view of an induction hardening system with a workpiece holding device according to a first exemplary embodiment of the present disclosure.

FIG. 1 schematically shows a plan view of an induction hardening system 100 that is designed to inductively harden a workpiece 2, e.g., a bearing ring, with the aid of an inductor 4. The induction hardening system 100 depicted in FIG. 1 is formed as a hardening system in which the inductor 4 always heats only one part of the workpiece 2 while the workpiece 2 is moved past the inductor 4. For this purpose the workpiece 2 is clamped into a main body portion 5 of a workpiece holding device 6 and moved along the inductor 4.

The workpiece holding device 6 includes clamping units 8-1, 8-2, 8-3 that are designed to hold the workpiece 2 in its position in a positionally accurate manner. For this purpose, the clamping units can be moved radially, axially, and/or tangentially in order to abut against the workpiece 2 and to secure its position. This radial, axial, and/or tangential movability of the clamping units also ensures that the clamping units can track or follow an expansion/contraction of the workpiece 2 induced by the heat treatment. For this purpose, movable elements (not depicted) can be provided on the clamping units; the movable elements are preloaded, for example, toward the workpiece and thus preferably abut against the workpiece with an adjustable clamping force.

Furthermore, FIG. 1 shows that in the exemplary embodiments depicted, the workpiece 2 lies against three support units 12-1, 12-2, 12-3.

Instead of now rotating the entire system 6 as in the prior art, according to the invention a drive unit 14 is furthermore provided that is designed to rotate the workpiece 2.

Here the drive unit 14 can be, for example, a friction wheel or a friction roller that acts directly on the workpiece 2 and sets it in rotation. In order to ensure that the movement of the workpiece 2 is not hindered or impeded by a friction against the clamping units 8 or support units 12, both the clamping units 8 and the support units 12 are advantageously equipped with rotatable elements. For this purpose, in the depicted exemplary embodiment of FIG. 1, the clamping units 8 include rotatable clamping elements in the form of clamping cylinders 10-1, 10-2, 10-3 that are rotatably supported and both facilitate the rotation of the workpiece 2 and form the above-described movable elements that apply the clamping force onto the workpiece 2.

In an analogous manner thereto, the support units 12 can also include rotatable support cylinders 16, in particular rotatable sleeves, that on the one hand provide a good contact surface of the workpiece 2 and an easy movability of the workpiece 2.

Of course, it is also possible to combine the clamping elements 10 and support cylinders 16.

The clamping unit 8, the support units 12, and/or the drive unit 14 can be moved radially, axially, circumferentially and/or tangentially in order to optimally abut against the workpiece 2. Furthermore, at at least one of the of the preferably multiple units 8, 12, 14, it is possible to attach at least one measuring device 13 that is configured to measure a contact force and/or clamping force and/or friction force between the clamping units and/or the support units and/or the drive unit, and the workpiece 2. Furthermore, a controller 15 can also be provided that interacts with the units 8, 12 and 14 such that the units 8, 12, 14 interact with the workpiece 2 with a predetermined contact force, clamping force, and/or friction force.

Instead of a separate drive device 14 as depicted in FIG. 1, one of the clamping units 8 and/or of the support units 12, in particular a rotatable clamping element 10 and/or a rotatable support cylinder 16, can also be configured as a drive unit 14.

Thus, for example, the clamping element 10 or the rotatable support cylinder 16 can itself be designed as friction wheel or friction roller that in turn acts directly on the workpiece 2 and sets it in rotation.

Figure 2:
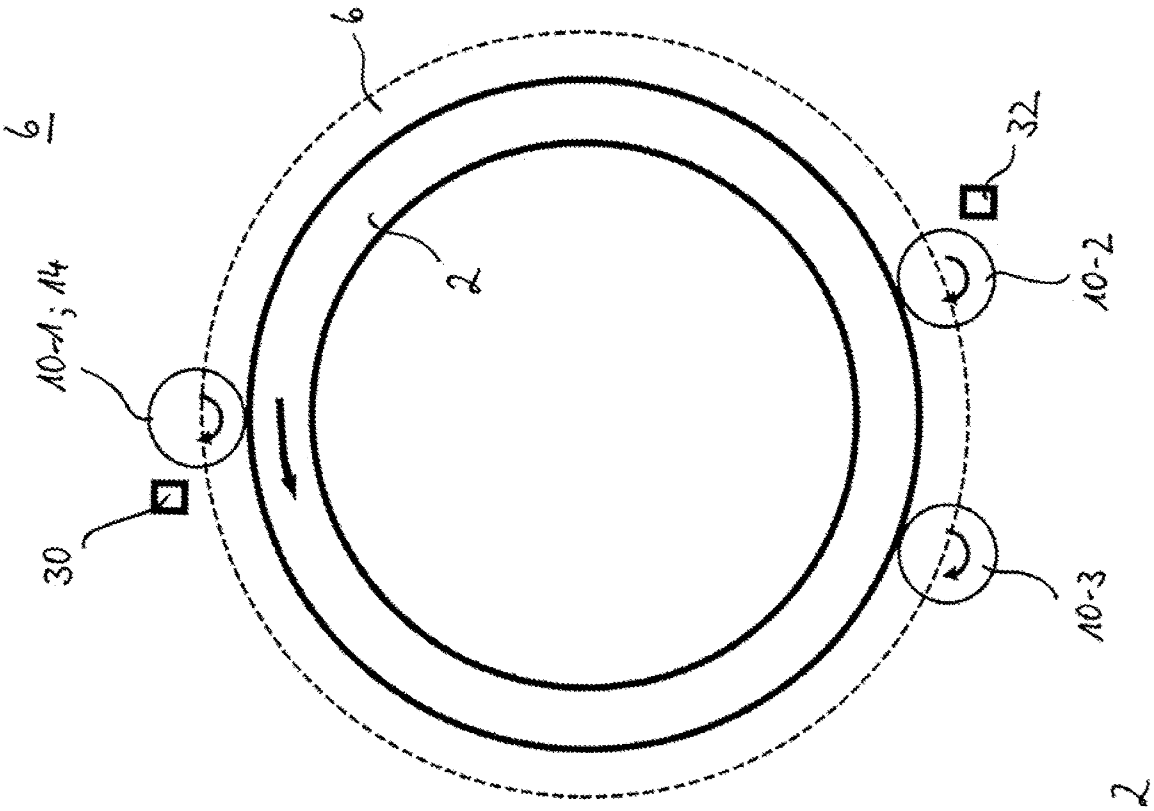
FIG. 2 is a schematic view of a workpiece holding device according to a second exemplary embodiment of the present disclosure.
Figure 3:
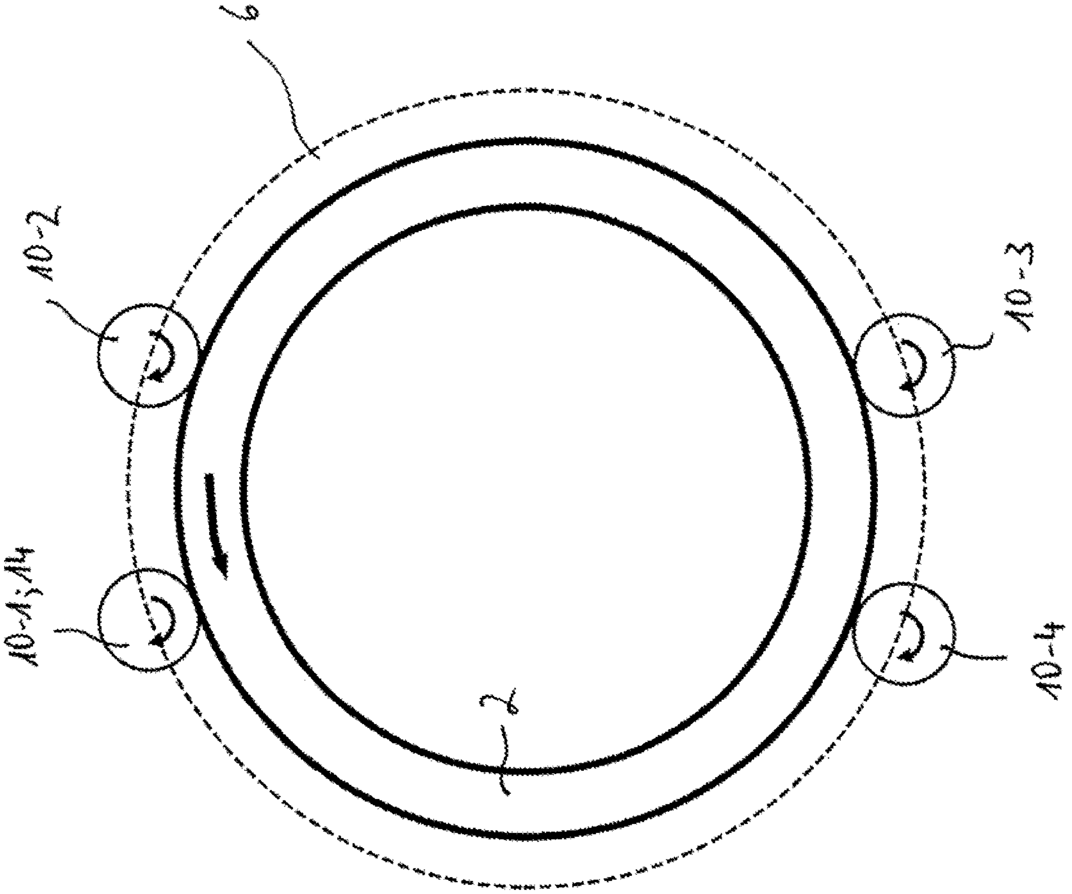
FIG. 3 is a schematic view of a workpiece holding device according to a third exemplary embodiment of the present disclosure.

FIGS. 2 and 3 each show exemplary embodiments in which the clamping elements 10 are configured as clamping cylinders. Furthermore, FIGS. 2 and 3 show that a clamping element 10, in particular, for example, the clamping cylinder 10-1, is configured as an actively rotating clamping cylinder and thus as drive unit 14. The other clamping cylinders 10-2, 10-3 and 10-4 (see FIG. 3) here are merely passively driven via the friction with the rotating workpiece 2. Furthermore, it can be seen from FIGS. 2 and 3 that the clamping units 8 need not be distributed along the workpiece 2 at the angular distance, rather, non-uniform distributions are also possible.

Furthermore, as indicated in FIG. 2, at least one measuring unit 30, 32 can be provided that, for example, measures a contact force, friction force, and/or clamping force, and provides it to a controller 15 which, based on the measurement, controls the clamping units 8, support units 12, or drive unit 14, in order to maintain a predetermined clamping force, friction force, and/or contact force during the heat treatment, even with a thermal expansion and/or contraction of the workpiece 2.

Furthermore, the measuring units 30, 32 can be configured as rotational speed measuring units in which the measuring unit 30 determines a rotational speed of the clamping cylinder 10-1. In addition, a further rotational speed measuring unit 32 is provided on one of the passively rotating clamping cylinders, here clamping cylinder 10-2, that determines a rotational speed of the passively driven clamping cylinders 10-2, 10-3. The measured rotational speeds can in turn be provided to a controller 15, wherein the controller is configured to determine a slippage of the workpiece from a rotational speed difference between the actively and passively driven clamping cylinders 10. With the aid of the rotational speed measurement, it can be determined whether there is sufficient friction force/contact force of the drive unit 14, or whether the clamping force applied by the clamping units 8 is sufficient to attach the workpiece sufficiently firmly in the workpiece receptacle. Thus, for example, the controller can be designed to control the drive unit and/or the clamping unit and/or the support unit in order to optimize the contact force or the clamping force, and to minimize the slippage.

In particular, when a predetermined rotational speed difference is exceeded, it is advantageous when the controller is furthermore designed to increase a contact force of the friction roller/of the friction wheel and/or a clamping force of the clamping units and/or to issue a notification about an increased slippage.

Figure 4:
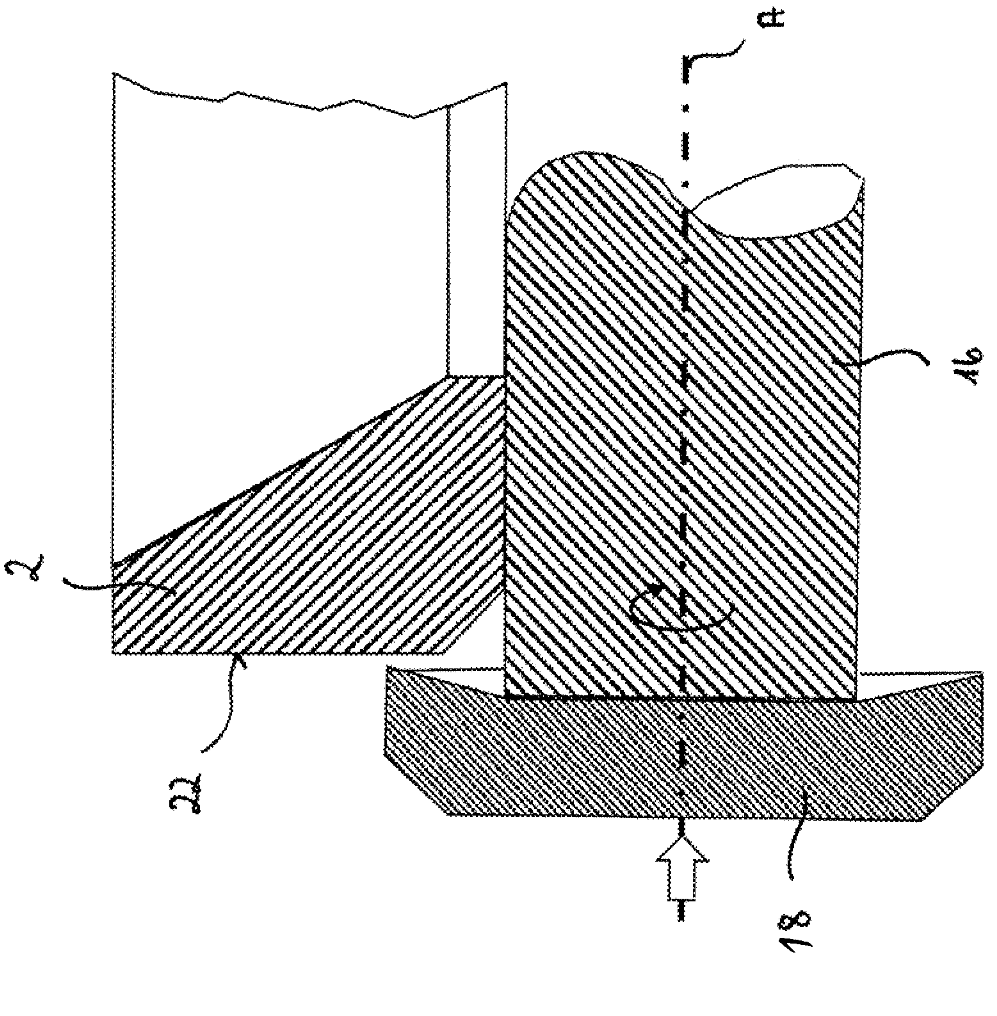
FIG. 4 is a schematic view of a workpiece holding device according to a fourth exemplary embodiment of the present disclosure.

FIG. 4 shows a further exemplary embodiment, in which the rotatable support cylinder 16 of the support unit 12 is equipped with a friction wheel 18. Here the friction wheel 18 abuts against a radial outer surface 22 of the workpiece and can thus simultaneously exert a clamping force (see arrow) on the workpiece 2. Thus the friction wheel 18 also assumes the function of the clamping unit 8. During rotating of the sleeve about its longitudinal axis A, the friction wheel 18 is simultaneously rotated. Due to the abutment (friction) of the friction wheel 18 against the outer surface 22 of the workpiece, the rotational movement of the support cylinder 16 is also transmitted via the friction wheel 18 onto the workpiece 2 so that the workpiece 2 is also rotated. During rotating of the friction wheel 18 or of the support cylinder 16, the workpiece 2 is thus rotated by the support unit 12 and along the friction wheel 18. A combined clamping, contact and drive unit can thereby be provided.

Overall, by the moving of the workpiece 2 alone instead of the entire workpiece holding device, it can be achieved that the wear and also the energy expenditure during the operating of an induction system is significantly reduced, since only the workpiece itself, but no longer the entire work table, need be set into motion. This also makes it possible that a relative speed of the workpiece with respect to the inductor can be set particularly precisely, which in turn leads to an improvement of the hardening result.

As used herein, a controller may be a programmable hardware component that can be formed by a processor, a computer processor (CPU=central processing unit), an application-specific integrated circuit (ASIC), an integrated circuit (IC), a computer, a system-on-a-chip (SOC), a programmable logic element, or a field programmable gate array (FGPA) including a microprocessor.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved workpiece holding devices.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

100 Induction hardening system
2 Workpiece
4 Inductor
5 Main body
6 Workpiece holding device
8 Clamping unit
10 Clamping element
12 Support unit
13 Measuring device
14 Drive unit
15 Controller
16 Rotatable support cylinder
18 Friction roller
22 Outer surface of the workpiece

What is claimed is:

1. A workpiece holding device for holding a workpiece in a heat treatment system, the heat treatment system including an inductor, while the workpiece undergoes a thermal expansion and/or contraction, the workpiece holding device comprising:

at least two clamping units configured to apply a radial and/or an axial clamping force to the workpiece to hold the workpiece in the workpiece holding device in a predefined position, and a drive unit configured to rotate the workpiece relative to the inductor, wherein the drive unit comprises a friction wheel or a friction roller configured to abut against the workpiece and frictionally engage the workpiece in order to rotate the workpiece.

2. The workpiece holding device according to claim 1, wherein a friction force between the drive unit and the workpiece is defined by a contact force between the drive unit and the workpiece.

3. The workpiece holding device according to claim 1, wherein the at least two clamping units each include a rotatable clamping cylinder abutting against the workpiece, and the at least three support units each include a rotatable support cylinder on which the workpiece rests.

4. The workpiece holding device according to claim 3, wherein a first one of the at least two rotatable clamping cylinders is actively driven and a second one of the at least two rotatable clamping cylinders is passively driven by a rotation of the workpiece, or wherein a first one of the at least three rotatable support cylinders is actively driven and a second one of the at least three support cylinders is passively driven by the rotation of the workpiece.

5. The workpiece holding device according to claim 4, including a first rotational speed measuring unit configured to measure a rotational speed of the drive unit, and a second rotational speed measuring unit is configured to measure a rotational speed of the second one of the at least two rotatable clamping cylinders or a rotational speed of the second one of the at least three rotatable support cylinders, and a controller configured to determine a rotational speed difference between the rotational speed of the drive unit and the rotational speed of the second one of the at least two rotatable clamping cylinders or a rotational speed difference between the rotational speed of the drive unit and the rotational speed of the second one of the at least three rotatable support cylinders.

6. The workpiece holding device according to claim 5, wherein the controller is configured to produce an output indicative of the rotational speed difference between the rotational speed of the drive unit and the rotational speed of the second one of the at least two rotatable clamping cylinders exceeding a predetermined value or indicative of a rotational speed difference between the drive unit and the rotational speed of the second one of the at least three rotatable support cylinders.

7. The workpiece holding device according to claim 1, wherein a first clamping unit of the at least two clamping units is preloaded against the workpiece to maintain the clamping force as the workpiece thermally expands and/or thermally contracts.

8. The workpiece holding device according to claim 7, including a controller configured to set the clamping force.

9. The workpiece holding device according to claim 8, including a force measuring device operably connected to the controller and configured to measure the clamping force.

10. The workpiece holding device according to claim 1, including:

a main body portion supporting the at least two clamping units and the drive unit, and at least three support cylinders supported by the main body portion and configured to axially support the workpiece, wherein the drive unit comprises a friction wheel or a friction roller configured to abut against the workpiece and frictionally engage the workpiece in order to rotate the workpiece, wherein the at least two clamping units each include a rotatable clamping cylinder abutting against the workpiece, and wherein the at least two clamping units are configured to maintain the clamping force against the workpiece during the thermal expansion and/or contraction.

11. A method comprising:

providing a workpiece holding device according to claim 1, placing the workpiece into the workpiece holding device, moving the at least two clamping units into abutment with the workpiece, and clamping the workpiece with a predetermined force, powering the drive unit to rotate the workpiece held by the at least two clamping units at a predetermined rotational speed, performing a heat treatment on at least a portion of the rotating workpiece, starting the thermal treatment, and maintaining the clamping force during the heat treatment while the workpiece thermally expands and/or thermally contracts.

12. The method according to claim 11, wherein maintaining the clamping force comprises passively maintaining the clamping force.

13. The method according to claim 11, wherein maintaining the clamping force comprises actively maintaining the clamping force.

14. A workpiece holding device for holding a workpiece in a heat treatment system while the workpiece undergoes a thermal expansion and/or contraction, the workpiece holding device comprising:

a main body portion, at least three support cylinders extending from the main body portion and configured to axially support the workpiece, and at least three clamping cylinders configured to apply a radial clamping force to the workpiece to hold the workpiece in the main body portion, wherein a first one of the at least three clamping cylinders is configured to be actively driven by a drive unit to rotate the workpiece in the main body portion and all other ones of the at least three clamping cylinders are passively driven by contact with the workpiece, and wherein the at least three clamping cylinders are configured to move to maintain the radial clamping force during the thermal expansion and/or contraction of the workpiece.

15. The workpiece holding device according to claim 14, wherein the at least three support cylinders are passively driven by contact with the workpiece.

16. A system comprising:

the workpiece holding device according to claim 14, the workpiece, and the drive unit, wherein the heat treatment system includes an inductor, and wherein the drive unit is configured to rotate the workpiece relative to the inductor.

17. A system comprising:

a workpiece holding device according to claim 1, and the workpiece, wherein the friction wheel or the friction roller abuts against the workpiece, and wherein the at least two clamping units are configured to maintain the radial/or the axial clamping force against the workpiece during the thermal expansion and/or contraction.

* * * * *